June 18, 1963 C. G. B. GARRETT ETAL 3,094,671

FIELD EFFECT PARAMETRIC AMPLIFIER

Filed June 12, 1959 6 Sheets-Sheet 1

INVENTORS: C. G. B. GARRETT
W. G. PFANN

BY George S. Indig

ATTORNEY

INVENTORS: C. G. B. GARRETT
W. G. PFANN
BY George S. Indig
ATTORNEY

INVENTORS: C. G. B. GARRETT
W. G. PFANN
BY George S. Indig
ATTORNEY

FIG. 8
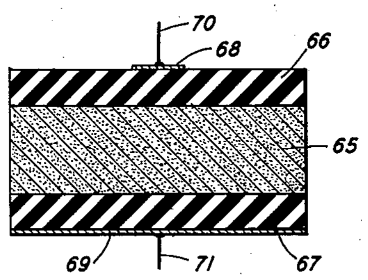
FIG. 9
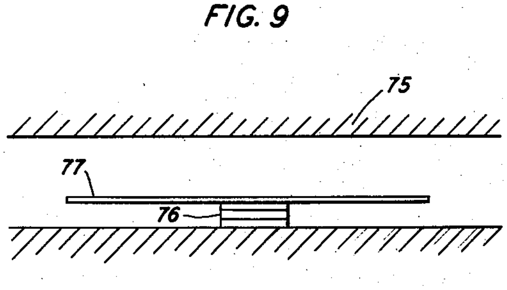
FIG. 10A
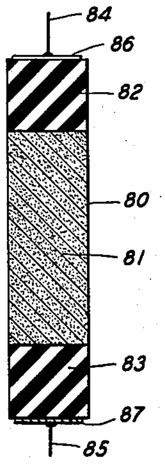
FIG. 10B
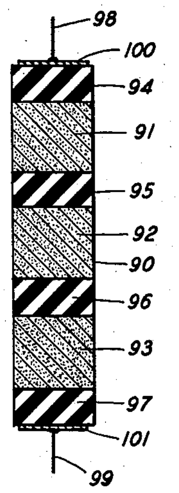
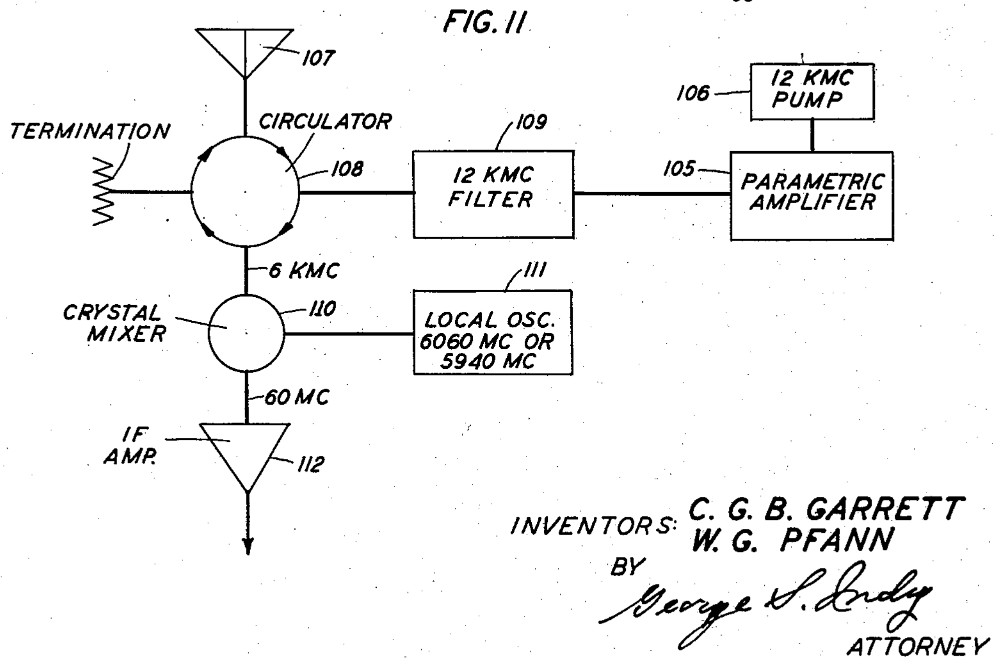
INVENTORS: C. G. B. GARRETT
W. G. PFANN
BY George S. Indig
ATTORNEY

INVENTORS C. G. B. GARRETT
W. G. PFANN

BY *George S. Indig*

ATTORNEY

INVENTORS: C. G. B. GARRETT
W. G. PFANN
BY George S. Indig
ATTORNEY 3,094,671
Patented June 18, 1963

3,094,671

FIELD EFFECT PARAMETRIC AMPLIFIER

Charles G. B. Garrett, Morristown, and William G. Pfann, Far Hills, N.J., assignors to Bell Telephone Laboratories, Incorporated, New York, N.Y., a corporation of New York Filed June 12, 1959, Ser. No. 819,923
8 Claims. (Cl. 330—4.9)

This invention relates to a new class of semiconductor circuit elements. Certain devices of the inventive class may be operated as parametric amplifiers. Distinctive electrical properties suggest other uses, some of which are described herein.

As parametric amplifiers, the devices herein depend for their operation on the capacitative principle. In such operation, the capacitance of the device, which is extremely voltage-sensitive, is varied by means of impressed pump energy. Work done by this pump energy results in amplification of a signal being passed through the device. The devices herein are, therefore, superficially similar to the usual P-N junction parametric amplifier, which depends for its operation on the varying capacitance of a space-charge region produced in the vicinity of the junction.

The devices herein are conveniently grouped in two classes. The devices of the first class depend for their operation on the capacitative effect of the varying space-charge of a depletion layer region, as do the prior art P-N devices. Although the principle of operation of the prior art devices and the related class of devices of this invention is the same, there are certain important differences set forth herein.

The second class of devices of this invention depend for their operation on the capacitative effect produced by the varying field of a layer or layers of accumulated carriers. A device depending for its operation solely on this mechanism makes use of intrinsic semiconductive material containing no extrinsic carriers whatever. Other devices using extrinsic conductivity layers dependent on this phenomenon are described. As is described herein, these two classes of devices, the one depending on space-charge regions, the other on accumulated carriers, are not truly exclusive groupings. In certain of the devices herein, in which operation is premised primarily on depletion layers, there is, nevertheless, an accompanying effect due to accumulation and/or inversion layers. In certain of these devices, the effect of accumulation or inversion layers is deliberately minimized. In certain others, it is utilized so that the device actually depends for its effectiveness on both phenomena.

In common with other capacitance-dependent parametric amplifiers, the instant devices may be operated at room temperature or higher although cooling is permissible or sometimes even desirable. As in the P-N junction prior art devices, the noise level at any temperature may be estimated by comparison of operating frequency with cut-off frequency. Cut-off frequencies for these devices may be of the order of 10 kilomegacycles or higher for reasonable structure thicknesses.

For convenience, in the description of this invention reference is had to a prototype device of the first class of elements, depending primarily on a depletion region for operation. This device, herein designated "ONO," consists of a thin wafer of N-type material having a still thinner region of oxide on each of two opposite faces. Metallic contact is made to each of the said faces, generally by means of a vapor deposited metallic layer. It is to be understood that general reference to the ONO is not to be considered limiting. All principles discussed apply equally to the OPO configuration (oxide-P-type material-oxide), as well as to a whole series of composite devices including two or more units of such ONO or OPO configurations in series and/or parallel, sometimes within the same body.

Discussion is generally in terms of a semiconductive region of silicon and an oxide region of silicon oxide ($SiO_2$) generally produced in situ. It should be understood that the main function of the oxide layer is that of a capacitative dielectric. Accordingly, a broad range of other dielectric materials may be substituted. Silicon is, of course, considered merely exemplary of a large number of semiconductive materials. One or another of these materials may be indicated for reasons set forth herein. Providing the teachings of this invention are followed, any extrinsic semiconductive material having the requisite level of excess carriers may be used, regardless of the mechanism responsible for the presence or absence of such carriers.

Illustrative of the broad range of included configurations are those utilizing but a single dielectric layer, those having step or graded concentrations of excess carriers, and those utilizing a layer of compensated or intrinsic material. Although the various configurations are sometimes dependent on different parameters, certain of the aspects of the various configurations are similar or identical to those of the ONA prototype. Discussion of the ramifications of the ONO configuration should, therefore, be considered to be equally applicable to the other configurations of this invention in the absence of contrary indication.

In similar fashion, most discussion is in terms of use of the inventive devices as parametric amplifiers. Other uses are set forth herein. Design criteria, in many instances, are the same. It should be understood that this particular use of the device is also exemplary.

In accordance with this invention, therefore, there is described a new class of semiconductor devices. These devices include a region of semiconductive material, either intrinsic or extrinsic, the latter having an excess of either type of current carrier. At least a portion of at least one surface of this semiconductive region is covered with a dielectric material. In many of the devices of this invention this dielectric material is an oxide of the said semiconductive material, sometimes produced in situ. In use, electrical contact is made to the dielectric material so that electrical circuit coupling is always capacitative. In an important class of devices of this invention, an opposite face of the semiconductive region is bounded by an oxide or other dielectric layer, electrical contact being made thereto so that both sides of the device are capacitatively coupled. The semiconductive region may be intrinsic or extrinsic. Where extrinsic, it may be of uniform resistivity, or it may include a graded or step variation of excess carrier concentration. Composite devices also described herein may make use of two or more of any one or combination of the devices thus far described, either in parallel or in series. A particular form of such composite structures makes use of pellets, granules or flakes of semiconductive material having an intermediate layer of oxide or other dielectric matter. In many of the composite devices of this invention, electrode contact is made only with two or more outer surfaces.

The symmetrical or asymmetrical devices (those having oxide or other dielectric material intermediate two electrode connections), in contrast with the P–N junction devices of the prior art, have no "forward" direction, thereby limiting the maximum capacitance of the device. It is a design feature of these devices that maximum capacitance and other operating characteristics can be closely controlled by dimensions. Figure-of-merit calculations are included herein. Cut-off frequencies of the order of 10 kilomegacycles and higher are indicated. This description includes operation of the inventive devices, frequency limitations, various configurations including laminates and composites, and discussion of the responsible mechanisms including depletion layers and fields due to accumulated carriers. The prior art P–N junction parametric amplifier is sometimes used as a reference point.

In this discussion reference is made to the accompanying drawings, in which.

Figure 4:
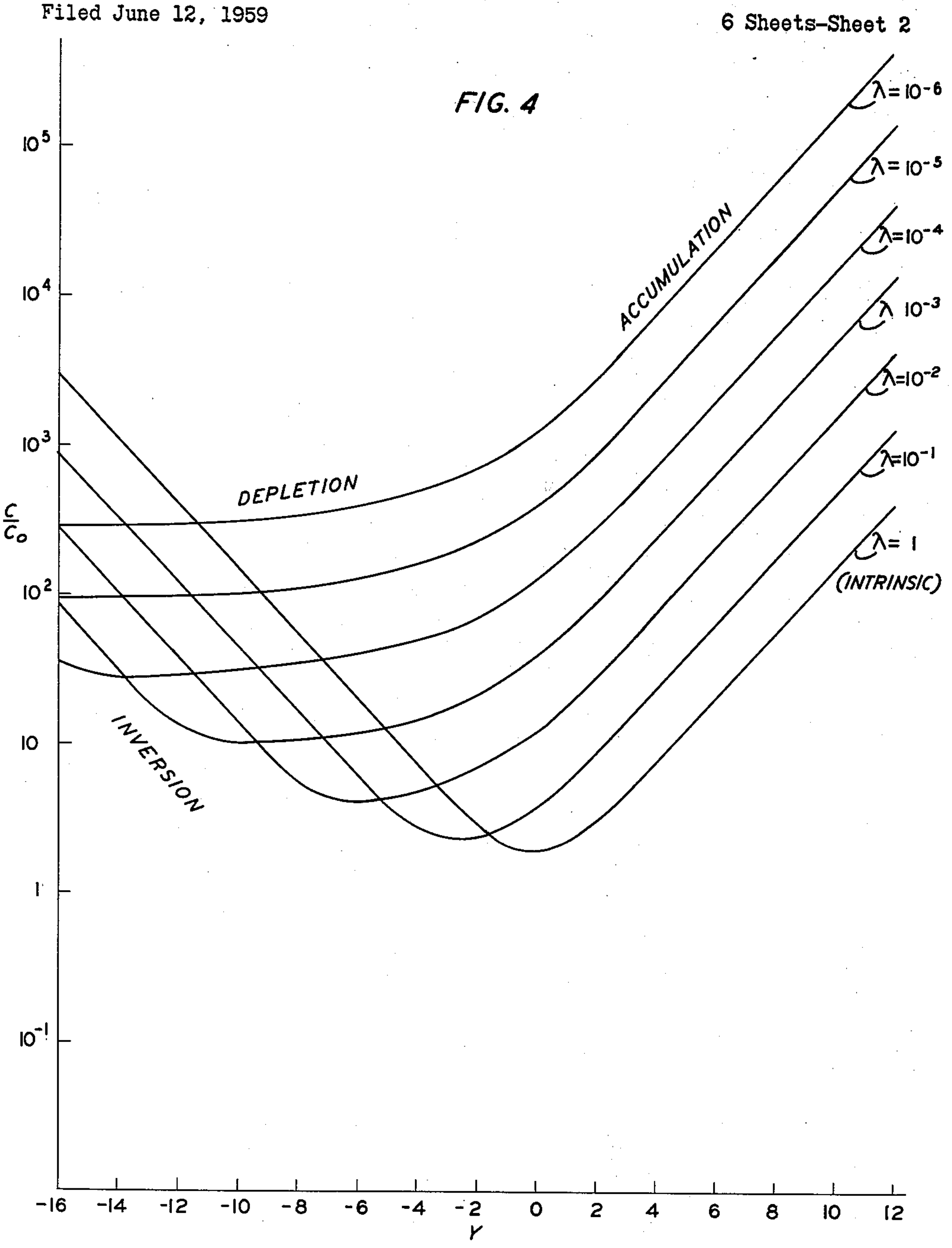
Figure 5:
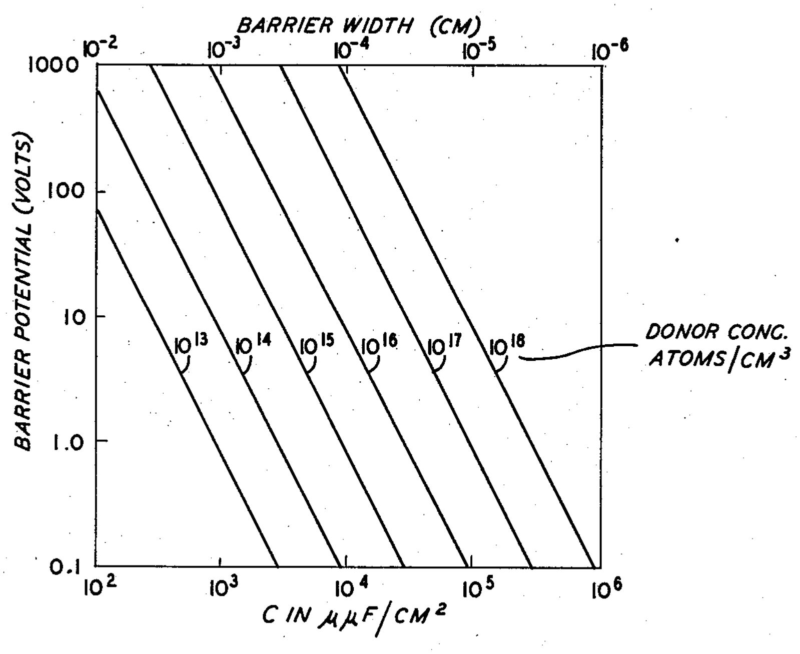
Figures 6, 7A, 7B:
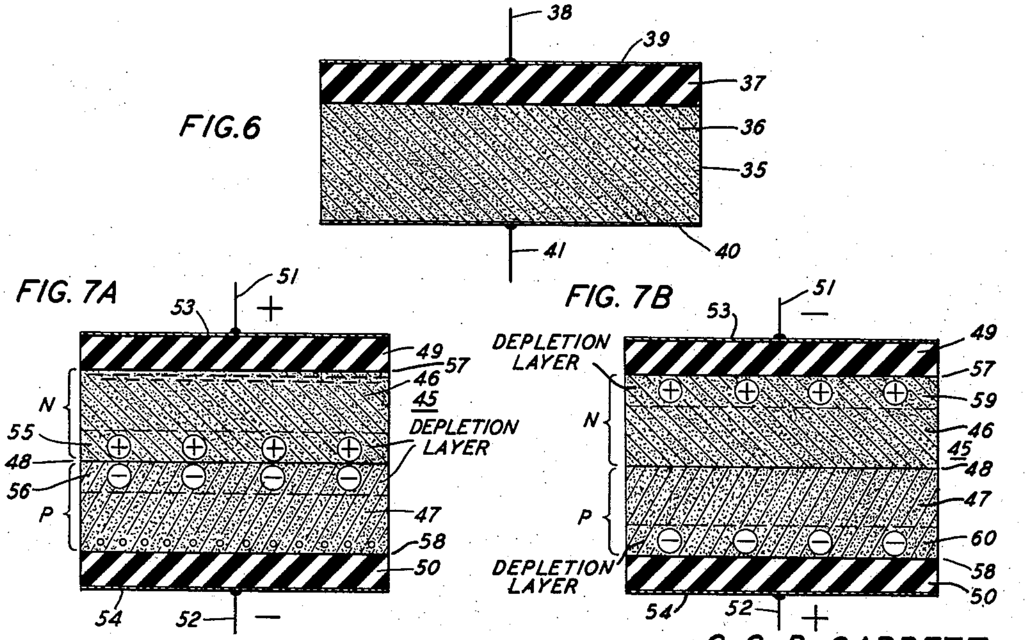

FIG. 4, on coordinates of dimensionless units of capacitance and dimensionless units of voltage across the space-charge region for various impurity levels also in dimensionless units, shows the variation of capacitance with applied voltage under various conditions described in the text;

FIG. 5, on coordinates of barrier potential against barrier width and capacitance, shows the variation of these parameters with various concentrations of excess carriers;

FIG. 6 is a front elevational view in section of a single oxide layer device of this invention;

FIGS. 7A and 7B are a front elevational view in section of an ONPO configuration illustrating the depletion layers produced in the two half-cycles of an applied sinusoidal pump signal respectively;

FIG. 8 is a front elevational view in section of a device of the ONO configuration;

FIG. 9 is a front elevational view in section of a portion of a wave guide including a strip-line coupled device of this invention;

FIG. 10A is a front elevational view in section of a device of the ONO configuration;

FIG. 10B is a front elevational view in section of a composite device having the same total dielectric thickness as that of FIG. 10A, to which reference is made in a discussion of the comparative merits of these devices;

FIG. 11 is a schematic view of a circuit including a sectional front elevation view of a parametric amplifier of this invention together with the various modulating, demodulating, and other circuit elements requisite to operation.

Figure 12A:
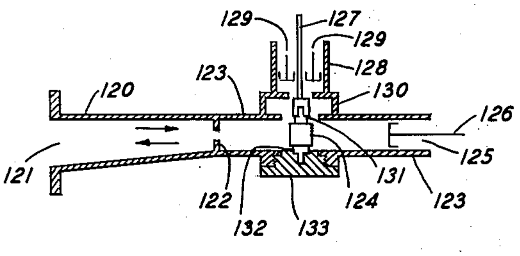
Figure 12B:
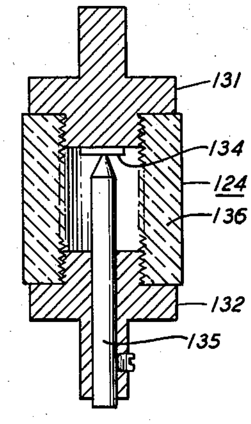
Figure 13A:
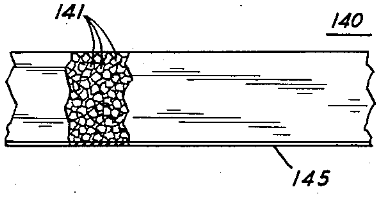
Figure 13B:
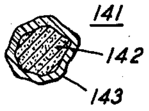
Figure 14A:
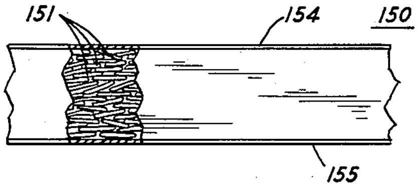
Figure 14B:
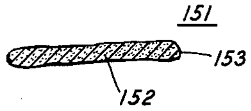
Figure 15:
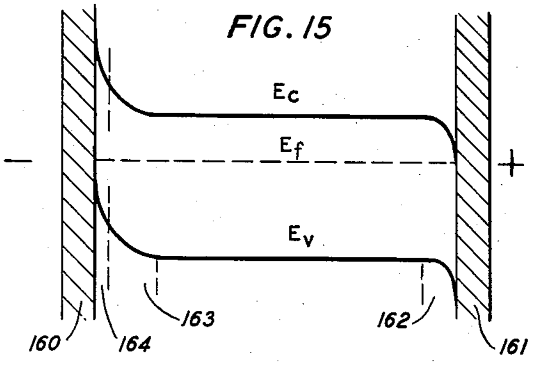
Figure 16:
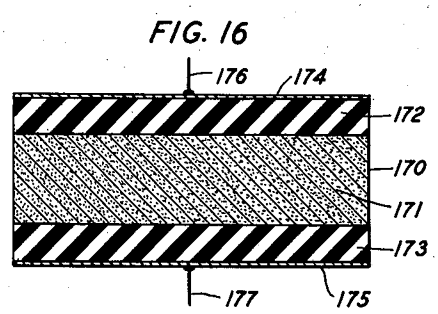
Figure 17:
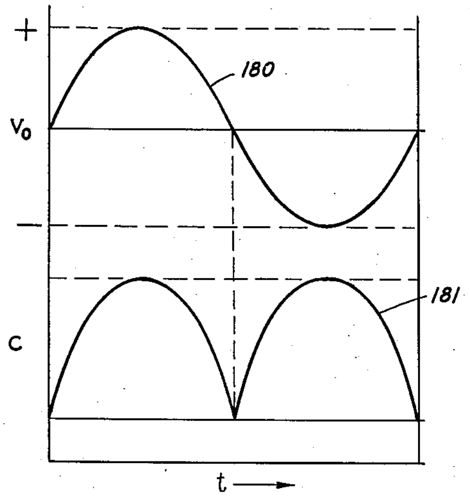
Figure 18:
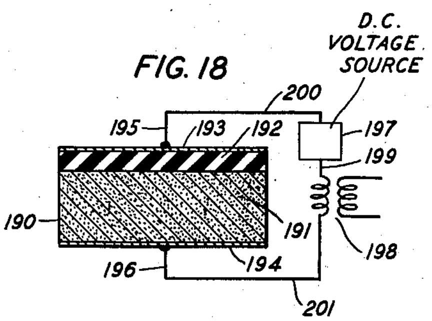
Figure 19:
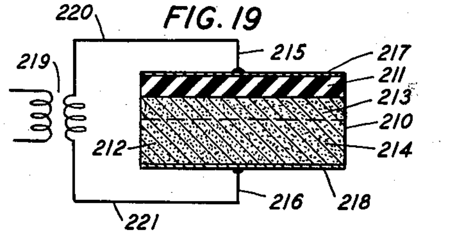
Figures 20, 22:
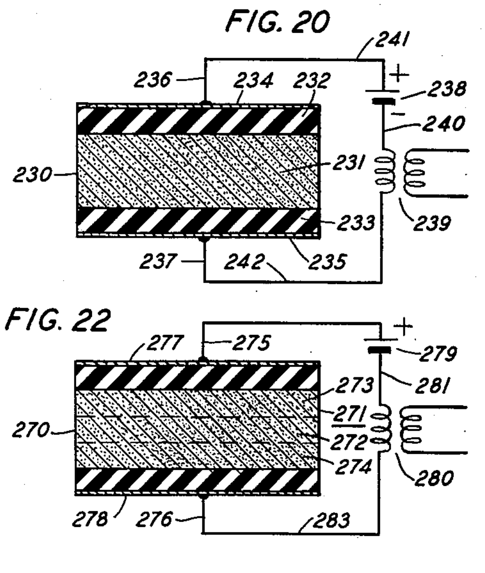
Figure 21:
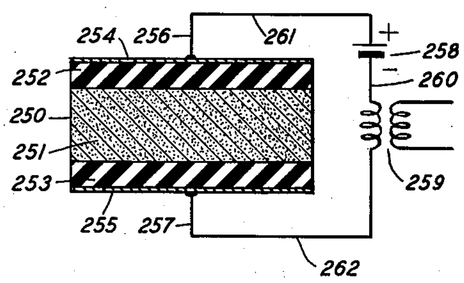

FIG. 12A is a cross-sectional view of a wave guide containing a device of this invention;

FIG. 12B is a cross-sectional view of the detail containing the device shown in FIG. 12A;

FIG. 13A is a front elevational view partly in section of a composite device of this invention in which the operative elements are oxide-coated and semiconductive particles;

FIG. 13B is a cross-sectional view of one of the particles of FIG. 13A;

FIG. 14A is a front elevational view partly in section of a composite device of this invention of a structure alternative to that of FIG. 13A, utilizing in this instance flakes of semiconductive material separated by dielectric layers as operative elements;

FIG. 14B is a cross-sectional view of an individual flake of the device of FIG. 14A;

FIG. 15 is an energy band diagram for an ONO device showing the effect of an applied D.-C. voltage on the conduction and valence bands to which diagram reference is made in a discussion of the effect of accumulation and depletion layers in the operation of a device herein;

FIG. 16 is a front elevational view in section of a device herein, the said device containing an intrinsic semiconductive region having opposite faces covered with dielectric material;

FIG. 17, on coordinates of voltage and capacitance against time, shows the relationship between capacitance and an applied sinusoidal signal in the device of FIG. 16;

FIG. 18 is a front elevational view in section of an ON device herein including a schematic representation of appropriate pump and biasing circuitry;

FIG. 19 is a front elevational view in section of an $ON^+N$ device herein together with a schematic representation of a suitable pump circuit in which the device is used as a parametric amplifier;

FIG. 20 is a front elevational view in section of an ONO device herein together with a schematic representation of appropriate biasing and pump circuitry;

FIG. 21 is a front elevational view in section of an OIO device herein together with a schematic representation of a circuit for biasing and applying a pump signal; and FIG. 22 is a front elevational view in section of an $ONN^+NO$ device herein together with a schematic representation of a circuit for operating the device.

Referring again to FIG. 1, the device depicted consists of a slice 1 of N-type silicon sandwiched between two layers 2 and 3 of silicon oxide. Electrode connection is made via evaporated metal layers 4 and 5 by electrodes 6 and 7. This device is the prototype ONO configuration. Oxide layers 2 and 3 may be grown thermally or anodically, or may be vapor deposited. For the bias shown (electrode 6 positive) electrons travel to the upper oxide silicon interface 8, leaving a depletion layer of positively charged donor ions of thickness $t$ at lower interface 9. Layer thickness $t$ is shown as bounded by dashed line 10.

Figure 1:
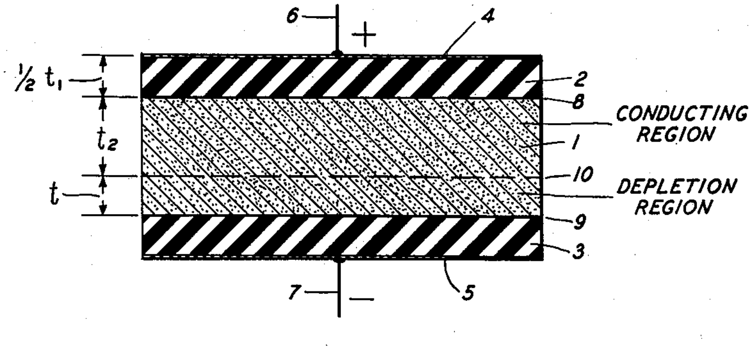
FIG. 1 is a front elevational view in section of a prototype ONO device.

In operation, the total capacitance of the device of FIG. 1 comprises the total fixed capacitance $C_1$ of the two oxide layers 2 and 3, together with the capacitance of any depletion layer such as 9—10 of the semiconductive region 1. The total capacitance, C, is represented by the equation:

$$\frac{1}{C}=\frac{1}{C_1}+\frac{1}{C_2}=\frac{t_1}{\epsilon_1 A}+\frac{t}{\epsilon_2 A} \qquad (1)$$

where $\epsilon$ denotes dielectric constant, the subscripts 1 and 2 referring to oxide layer and semiconductor, respectively, A area. Let:

$$\epsilon_2=\alpha\epsilon_1 \qquad (2)$$

Then:

$$C=\frac{\epsilon_1 A}{t_1}\left(\frac{1}{1+\frac{t}{\alpha t_1}}\right)=C_{\max}\left(\frac{1}{1+\frac{t}{\alpha t_1}}\right) \qquad (3)$$

The thickness, $t$, of the depletion layer varies approximately as $(V\rho)^{1/2}$, just as in a reverse-biased P-N junction, where $\rho$ is the original resistivity of the silicon (assumed here constant) and V is the voltage across the depletion layer.

If V is made large enough, essentially the entire silicon body, of thickness $t_2$, is consumed by space charge, C has its minimum value:

$$C_{\min}=C_{\max}\left(\frac{1}{1+\frac{t_2}{\alpha t_1}}\right) \qquad (4)$$

and the series resistance of the semiconductor is zero.

Figure 2:
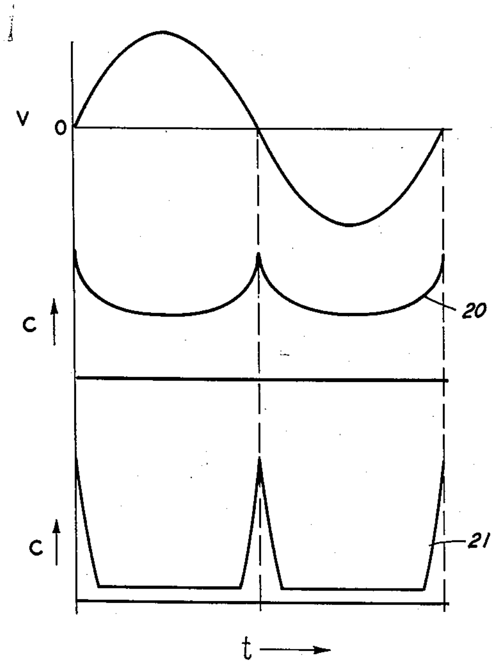
FIG. 2 is a plot showing the relationship between an applied sinusoidal voltage and a capacitance for two different conditions in a symmetrical device such as that of FIG. 1.

FIG. 2 is made up of three curves. In the uppermost of these, plotted in units of voltage on the ordinate and time on the abscissa, there is shown the form of a sinusoidal applied voltage. The middle curve, in ordinate units of capacitance and abscissa units of time, on curve 20 shows the corresponding capacitance variation for the case in which the maximum thickness of the space-charge region ($t_{max}$) is less than the thickness of the semiconducting region ($t^2$). The lowermost curve, 21, again plotted on coordinates of capacitance and time, shows the corresponding capacitance-time relationship for the case in which the maximum thickness of the space-charge region $t_{max}$ is equal to the thickness of the semiconducting region $t_2$ for a small fraction of the maximum voltage. As a consequence, for the conditions plotted on curve 21, $t_{max}$ exceeds $t_2$ for an appreciable time during each half-cycle of applied voltage. Note that the applied frequency of the capacitance variation is twice that of the voltage. This is because a depletion layer develops at one or the other interface on each half-cycle of voltage.

For the conditions corresponding with curve 21 of FIG. 2, C is at its minimum value over most of the half-cycle and peaks sharply to a maximum each half-cycle. In general, $t_2$ must be quite small, of the order of $10^{-4}$ centimeter, to achieve this condition for voltages less than of the order of 10 volts.

Figure 3:
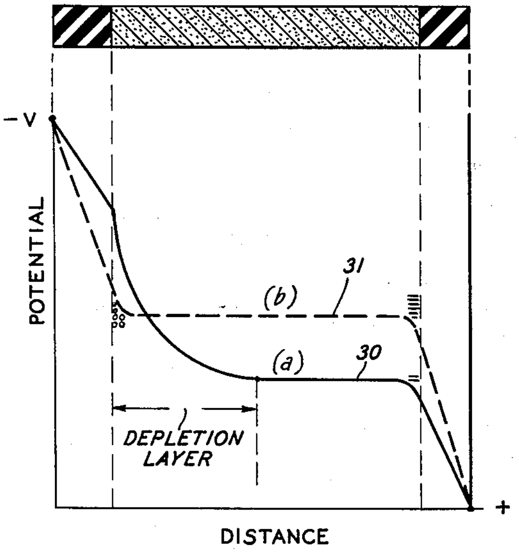
FIG. 3 is a front elevational view in section of a device herein together with a corresponding plot on coordinates of potential and distance illustrating the potential distribution across a typical device under two conditions of applied voltage.

Reference is had to FIG. 3 in a discussion of the various limiting factors that determine ultimate upper and lower frequencies. The effect of various circuit parameters on these frequency limitations is discussed later.

One upper limitation is the same as that for a junction capacitor, namely, the time, $\tau_h$, required to sweep electrons out of the depletion-layer region, given by:

$$\tau_h = \frac{v}{t} \tag{5}$$

For silicon or germanium, the maximum velocity, $v$, of an electron is of the order of $10^7$ centimeters per second, and a typical value of $t$ may be of the order of $10^{-4}$ centimeter. Thus, $\tau_h$ can be $10^{-11}$ second, corresponding to a frequency of $(1/\tau_h)$ of the order of $10^{11}$ cycles per second. The maximum practical frequency is somewhat lower (for $t=10^{-4}$) and $10^{11}$.

Another limit on the upper operating frequency is the RC-time, designated $\tau_{RC}$, which is discussed below in connection with Equation 14.

A low frequency limit exists in certain cases because of the thermal generation of electron-hole pairs in the semiconductor. As this phenomenon is intimately involved in the operation of a device of this invention and has other important consequences, we discuss it in some detail.

Assume a steady voltage to be applied to an ONO. The potential distribution a very short time after the voltage is applied is shown approximately by curve 30 of FIG. 3. A large fraction of the total voltage is across the depletion layer of positive donor ions in the semiconductor. Electrons that have left the depletion layer accumulate in a thin layer, of relatively high capacitance, in the silicon at the positive interface.

In time, however, thermally generated carriers reduce the voltage across the depletion layer by increasing its capacitance. Generated holes accumulate at the negative interface while generated electrons, in effect, cancel positive charges in the depletion layer. The usual end result is a thin layer of excess holes at one interface, called an inversion layer, and excess electrons at the other interface, called an accumulation layer, as shown in curve 31 of FIG. 3. Since the voltage sensitivity of the ONO configuration depends mainly on the variation of the thickness of the depletion layer, excess carrier generation decreases this voltage sensitivity. There is a compensating effect for parametric applications, namely that the resistance of the semiconductor is decreased, which is discussed later.

An order of magnitude estimate of the time, $\tau_l$, for the transformation of the depletion layer is given by:

$$\tau_l = \frac{Q}{I_s} \tag{6}$$

where $I_s$ is comparable to the saturation current of a silicon P-N junction and Q is the charge stored in the depletion layer, given by:

$$Q = (2eN\epsilon V)^{1/2} \tag{7}$$

where:

$e$ is electronic charge in coulombs $(1.6\times10^{-19})$
$\epsilon$ is dielectric constant in farads per centimeter
N is carrier density in electrons per cubic centimeter
V is voltage across depletion layer.

*Illustrative Example 1*

Equation 6 above is used to determine the low frequency cut-off for a typical silicon device. The following assumed values are typical of those commonly available. They are: $N=10^{16}$, $\epsilon=10^{-10}$, $V=1$ volt, $I_s=10^{-7}$ ampere per square centimeter. Substituting in Equation 7:

$$Q=(2\cdot1.6\cdot10^{-19}\cdot10^{16}\cdot10^{-10}\cdot1)^{1/2}\cong5\times10^{-7} \text{ coulomb.}$$

From Equation 6:

$$\tau_l \cong \frac{5\times10^{-7}}{10^{-7}} \cong 5 \text{ seconds}$$

*Illustrative Example 2*

Using the same calculations and values for germanium, assuming $I_s$ is of the order of $10^{-4}$ ampere per square centimeter, it is found that $\tau_l\cong10^{-3}$ second.

If the operating frequency for the device is appreciably less than the fraction $1/\tau_l$, the capacitance based on depletion layer variation is relatively insensitive to voltage. In this instance, the sensitivity resides in the variation in capacitances of the layers of accumulated carriers (thermally generated) at the interfaces. As intrinsic conductivity is approached, the sensitivity of the capacitance of the accumulated carrier layers increases. As discussed generally in conjunction with FIGS. 15 and 16, an exemplary class of devices of this invention is based primarily or entirely on such variation in capacitance of intrinsic or near-intrinsic semiconductor layers. In microwave applications, where the frequency is generally considerably higher than $1/\tau_l$, and particularly where the conductance of the oxide or other dielectric layer or layers is negligible, the phenomenon of excess carrier generation still limits the effective thickness of the depletion layer. This limitation, which applies only to symmetrical devices, that is, devices of the ONO configuration, may be described as follows: An A.-C. pump voltage is applied. In the first half-cycle the accumulation charge built up may be negligible. In the next half-cycle, however, the voltage reverses, and most of the generated holes are transferred to the opposite interface. During this second half-cycle, new carriers continue to be thermally generated, holes so produced also migrating to that interface so that the accumulated layer during the second half-cycle is larger than it was during the first. During the first few half-cycles, the proportion of thermally generated holes lost by recombination during transfer across the body of the semiconductor is small. As the charge of excess holes builds up, however, the period of generation, $\tau_g$, decreases and the recombination period, $\tau_r$, increases. The period of generation, $\tau_g$, under these circumstances, is limited to that period during which the instantaneous applied potential exceeds that corresponding to the potential due to excess holes. When the periods of generation and recombination are about equal, the system is in equilibrium and no further build-up of the accumulated layer occurs, the generation being just sufficient to replenish holes lost in recombination during transfer.

As indicated above, accumulation layer build-up is generally a limitation on the sensitivity of capacitance to voltage for devices whose operation is premised primarily on the varying capacitance of depletion layers. As also indicated, certain other devices are deliberately designed to take advantage of the capacitance variation in one or more accumulation layers. Such devices include those utilizing intrinsic layers and also those utilizing extrinsic semi-conductor properties, particularly under certain bias or field conditions. These conditions are considered below in conjunction with the description of FIG. 4.

Even in a prototype ONO device, where operation is premised on the varying capacitance of the depletion layer, it is possible to minimize insensitization due to accumulation layer build-up. An obvious method is to provide a low conductivity leakage path through the oxide layers sufficient to carry off generated carriers. Such conductivity can be achieved by incorporating impurities or lattice defects in the oxide during its growth. Alternately, a very thin conducting coating can be evaporated over the exposed edges of the oxide-silicon junctions. With such provision, a device, even with substantial thermal generation, operates in the manner discussed on the text relating to FIG. 1.

Provision of a leakage path, discussed above, results in a device that operates much in the manner of the prior art reverse-biased p-n junction parametric amplifier. The effect of the series characteristics of a leakage path ONO are minimized by keeping the leakage path at a very low conductivity level. For example, for a silicon device of the type discussed in illustrative Example 1, and for the operating conditions there indicated a resistivity of $10^{12}$ ohm-centimeters is sufficient for silicon having a minority carrier lifetime of about one microsecond or smaller for lower lifetimes. This resistivity is, of course, considerably higher than that for the silicon body.

It should be noted that there are certain devices of the inventive class here described which, by their nature, are not susceptible to substantial insensitization of capacitance variation due to accumulated carriers. Such devices include those in the single oxide category, such as those of the ON configuration (FIG. 6), and those of the ON+N configuration (FIG. 19), in addition to those based on accumulation layer capacitance for their operation as discussed above.

FIG. 4 is based on equations published by Messrs. C. G. B. Garrett and W. H. Brattain, Physical Review, volume 99, pages 376–87, 1955. This figure is a plot of capacitance-voltage curves for intrinsic and N-type semiconductors. The horizontal coordinate, Y, is the applied voltage in reduced voltage units of $(eY/kT)$, where $(kT/e)$ is about 0.025 volt at room temperature, $k$ is Boltzmann's constant, and T is temperature in degrees Kelvin. The vertical coordinate is a measure of capacitance in units of $C/C_0$, where C is the total capacitance of the space-charge regions and $C_0$ is defined one-half the zero voltage capacitance of an accumulaion layer in an intrinsic semiconductor, both in farads per square centimeter. As an example, $C_0$ for silicon at room temperature is equal to about $3.9\times10^{-10}$ farad per square centimeter. The same constant for germanium at room temperature is about $8.6\times10^{-9}$ farad per square centimeter. The parameter $\lambda$ is defined as $$\lambda=\frac{p_0}{n_i} \text{ (which is also equal to the fraction } n_i/n_0\text{)} \quad (8)$$

where:

$p_0$=the equilibrium number of holes in an extrinsic material
$n_0$=the equilibrium number of electrons in an extrinsic material
$n_i$=the equilibrium number of electrons or holes in an intrinsic material.

In accordance with the coordinates as defined, a decreasing value of $\lambda$ denotes an increasing level of excess electrons in N-type material. For an N-type semiconductor, a positive value of Y indicates a bending downward of the energy band levels. Conversely, a negative value of Y indicates a bending upward.

The portions of the curves to the right of the abscissa value zero, that is, for positive values of Y, denote accumulation layer capacitances. The falling portions of the curves for negative values of Y denote depletion layer capacitances. The rising portions of the curves for negative values of Y denote inversion layer capacitances. The rising portions of the various curves with increasing absolute values of negative Y's represent the regions in which the inversion layer capacitance actually offsets the depletion layer capacitance. For operation in these regions, the total capacitance rises with increasing magnitude of voltage.

In general, the inversion and accumulation capacitances are confined to regions of the semiconductor of the order of a Debye length, L, in thickness, where $$L=\left(\frac{\epsilon kT}{2\pi ne^2}\right)^{1/2} \quad (9)$$

where:

$k$=Boltzmann's constant
T=temperature in degrees Kelvin
$n$=majority carrier concentration in cubic centimeters
$e$=electronic charge, $1.6\times10^{-19}$ coulomb
L is in centimeters.

The Debye length is at a maximum for intrinsic material (where $n$ is equal to $n_i$ in Equation 9). At room temperature, L is equal to about $2.3\times10^{-3}$ centimeter (this is a Debye length for silicon) for intrinsic silicon, about $1.4\times10^{-4}$ centimeter for intrinsic germanium, and about $5\times10^{-6}$ centimeter for intrinsic indium antimonide. L is largest and the corresponding accumulation layer capacitance, $2C_0$, is smallest for intrinsic material where:

$$C_0=\frac{\epsilon}{L} \text{ farads per square centimeter} \quad (10)$$

As the applied voltage increases, the number of carriers at the surface of the semiconductor increases sharply, and the corresponding Debye length over which most of them are added to the accumulation layer decreases. Both effects, increase in accumulated carriers and decrease in accumulation layer thickness, combine to produce a capacitance that incerases exponentially with voltage. The curves shown in FIG. 4 are specific for N-type material. For P-type material, the curves are reversed from left to right (mirror image) with the same $\lambda$ values for the corresponding curves. Further reference is had to FIG. 4 in the discussion of parametric amplifying device and other applications of voltage-sensitive capacitors that utilize accumulation layer or inversion layer capacitance effects, e.g., the device of FIG. 16.

A figure-of-merit equation has been derived for use in the design of the devices of this invention. This figure of merit differs from that generally used for the p-n junction type of device in taking account of the sensitivity of variation in capacitance as a function of voltage. This figure merit, F, is in the form of a cut-off frequency and is based on an expression for the requirement that a capacitance varied sinusoidally at frequency 2F causes oscillation in a circuit tuned to frequency F. The expression is:

$$\frac{\Delta C}{C_0}>\frac{2}{Q} \quad (11)$$

where $C_0$ is the mean capacitance, $\Delta C$ the amplitude of the variation. The figure of merit, F, is obtained by substituting the value $$\left(\frac{1}{2\pi FR_0C_0}\right)$$

for Q and replacing the > by an ≡:

$$F\equiv\frac{\Delta C}{4\pi R_0C_0^2} \quad (12)$$

Even where the device does not exhibit a sinusoidal capacitance variation in response to a sinusoidal pump voltage, as, for example, under the conditions applicable to curve 21 of FIG. 2 ($t_{max}$ equal to $t_2$ at less than maximum peak voltage), Equation 12 is, nevertheless, useful as the basis for an expression indicating the effect of the parameters of the device on its maximum frequency cut-off where the device is operated as a parametric amplifier. Accordingly, let:

$$\Delta C \equiv C_{max} - C(t_0) = C_{max} - C_0 \qquad (13)$$

where $C(t_0)$ is the capacitance of the semiconductor at mean thickness, $t_0$, of the depletion layer. Let:

$$R_0 \equiv \frac{\rho(t_2 - t_0)}{A} \qquad (14)$$

where:

$\rho$=resistivity of semiconductor outside depletion layer in ohm-centimeters $t_2$=thickness of semiconductor slice in centimeters $t_0$=mean thickness of depletion layer in centimeters A=area in square centimeters.

In Equation 14, $R_0$ is defined as in Equation 12. This value is considered to represent the mean ohmic resistance of the part of the semiconductor thickness not included within the depletion layer. Actually, $R_0$ in Equation 12 is assumed to include all of the series resistance in the circuit and to be constant. This assumption is considered to be a valid, first order approximation.

If the resistance, $R_c$, of the external circuit is included, a figure of merit designated F* results which is related to F by the expression:

$$F^* = \frac{F}{1 + \left(\frac{R_c}{R_0}\right)} \qquad (14a)$$

Thus, F* is always less than F.

Substituting Equations 13 and 14 in Equation 12 and utilizing Equation 3, the following equation is obtained:

$$F = \left(\frac{1}{4\pi\epsilon_2\rho}\right)\left(1 + \frac{t_0}{\alpha t_1}\right)\left(\frac{t_0}{t_2 - t_0}\right) \qquad (15)$$

The assumed constant value for $R_0$ is strictly valid only where $t_0$ is appreciably less than $t_2$. Large F is favored by large $t_0$. The indications are that if $t_0$ is so large compared to $t_2$ that Equation 15 no longer represents a valid approximation, the actual figure of merit, F, is increased.

A basic upper frequency limit is the RC-time designated $\tau_{RC}$, and equal to the product of the mean circuit resistance, $R_0$, in ohms and the mean capacitance, $C_0$, in farads. The cut-off frequency, $f_{co}$, is defined as that at which:

$$\omega\tau_{RC} = 2\pi f \tau_{RC} = 1$$

$$f_{co} = \frac{1}{2\pi\tau_{RC}} = \frac{1}{2\pi R_0 C_0} \qquad (14b)$$

It is evident that the figure of merit, F, defined in Equation 12 is the product of two factors that are important in parametric amplification. One factor is the cut-off frequency, just defined. The other is $(\Delta C/C_0)$, which is a measure of the sensitivity of capacitance to pump voltage. While F in Equation 12 as written has the dimensions of frequency, F is not actually the cut-off frequency. The cut-off frequency is $f_{co}$, defined above.

In general, however, when operating at a frequency below $f_{co}$, the larger F is, the lower will be the noise figure of the parametric amplifier. This fact is in accord with existing theory and experiment for P-N junction devices.

Strictly speaking, $f_{co}$ should be defined in terms of the capacitance of the semiconductor only, whereas $C_0$ in Equation 14b includes the oxide capacitance. However, in well-designed devices the oxide capacitance is large compared to the depletion layer capacitance and, hence, $C_0$ is very nearly equal to the depletion layer capacitance.

FIG. 5 is useful in determining values of F. This figure, on cordinate of barrier potential in volts versus capacitance, C, in micromicrofarads per square centimeter for various donor concentrations expressed in atoms per cubic centimeter shows the relationship between the capacitance of the depletion layer and the applied voltage for various doping levels. Use is made of this figure in the following illustrative example:

*Illustrative Example 3*

For a device of the ONO configuration having a center region of N-type silicon and two outer regions of silicon dioxide, Equation 15 may be written as:

$$F \cong \left(\frac{Ne\mu}{4\pi\epsilon_2}\right)\left(1 + \frac{t_0}{\alpha t_1}\right)\left(\frac{t_0}{t_2 - t_0}\right) \qquad (15a)$$

where $\mu$ denotes mobility in centimeters squared per volt-second. For N-type silicon:

$$F \cong (2 \times 10^{-5} n)\left(1 + \frac{t_0}{3t_1}\right)\left(\frac{t_0}{t_2 - t_0}\right) \qquad (15b)$$

The plot of FIG. 5 is conveniently used with Equation 15b. For example, taking $t_1 = 1 \times 10^{-5}$ centimeter, $t_2 = 2.5 \times 10^{-3}$ centimeter, and assuming the maximum voltage to be four volts, the mean depletion layer width, $t_0$, is about $4 \times 10^{-5}$ centimeter at $n = 10^{16}$ atoms per cubic centimeter. This corresponds to $F \cong 6 \times 10^9$. As is seen from FIG. 5 and from the illustrative example above, larger figure of merit, F, may be achieved by increasing the concentration of donor atoms, by reducing the thicknesses of the oxide layer, $t_1$, and of the semiconductor layer, $t_2$, and also by increasing $t_0$, the mean thickness of the space-charge region, by increasing the applied voltage, V.

In a preferred design and under preferred operating conditions, the silicon layer, $t_2$, is made thin enough and the voltage, V, high enough so that the depletion layer thickness is equal to the value $t_2$, the thickness of the silicon wafer for peak pump voltage. Under these conditions, $K_0$ is equal to the resistance of half the wafer thickness and $t_0$ in Equation 15 is equal to $t_2/2$.

Substituting in Equation 13:

$$F = \frac{1}{4\pi\epsilon_2\rho} \cdot \left(1 + \frac{t_2}{2\alpha t_1}\right)\left(t_0 = \frac{t_2}{2}\right) \qquad (16)$$

The following calculation is made for a device of the characteristics described in the preceding paragraph and under the designated pump conditions:

*Illustrative Example 4*

The mode of operation serving as the basis for Equation 16 is applied to a silicon device of the ONO configuration. The following values are assumed: $V_{max}$ equals 4 volts, $t_2$ is equal to the thickness of the depletion layer at $V_{max}$ and equals $8 \times 10^{-5}$ centimeter, $n$, donor concentration, equals $10^{16}$ (corresponding to a resistivity of the order of 0.5 ohm-centimeter).

Substituting in Equation 16, it is found that F is equal to about $4 \times 10^{11}$.

The device discussed in illustrative Example 4 is of the order of $10^{-4}$ centimeter in overall thickness. Methods for using greater overall thicknesses, so as to simplify construction, and yet retaining effective thicknesses of the same order or less are discussed below. Alternate structures achieving this desideratum include the composite devices of, for example, FIGS. 10B, 13 and 14, as well as wafers having graded or step concentrations of carriers as described in conjunction with FIG. 19.

Still another configuration achieving this desired end result is the ONN+NO device shown in and discussed in conjunction with FIG. 22.

In connection with the above, it may be noted that the thermally generated excess carriers discussed above, most pronounced where the oxide has very low conductivity, effectively reduce the series resistance of the semiconductor portion of the device as these carriers become current carriers when the voltage reverses. Accordingly, the decrease in voltage sensitivity is offset by a decrease in resistance, so that the impairment in figure of merit is limited.

The device shown in FIG. 6 is of the ON configuration. This device, 35, consists of semiconductor layer 36 and oxide layer 37. Electrode contact is made to oxide layer 37 by electrode 38 via vapor-deposited metal layer 39. Electrode contact to semiconductor layer 36 is made via metal contact 40 by electrode 41. This device is essentially one-half of an ON configuration. Unlike the symmetrical devices, the capacitance varies at the same frequency as the pump, that is, once for every cycle rather than once for every half-cycle, as in the ONO. A build-up of excess carriers produced by thermal generation is minimized in the ON configuration since carriers cannot accumulate at the metal interface thereby avoiding build-up. The contact resistance between metal layer 40 and semiconductor layer 36 is desirably low.

FIGS. 7A and 7B show an ONPO configuration for two bias conditions. The device consists of semiconductor layer 45 having N-type region 46, P-type region 47 and resultant P-N junction 48. The device is bounded at either opposing surface by oxide layers 49 and 50. Electrical contact is made to oxide layers 49 and 50 by electrodes 51 and 52 via deposited metal layers 53 and 54. For the bias condition shown in FIG. 7A, N-region positive, P-N junction 48 is biased reverse, so resulting in depletion layers 55 and 56. For the bias condition of FIG. 7B, N-region negative, ON junction 57, intermediate N-region 46 and O region 49, as well as OP junction 58, intermediate P-region 47 and O region 50 are biased reverse, so resulting in depletion layers 59 and 60.

For the same semiconductor and oxide dimensions as in ONO, the ONPO has greater voltage sensitivity. This is due to the fact that a given applied voltage divided between two similar space-charge regions produces a greater total space-charge thickness than it does across one region. This observation has an important bearing on laminates, discussed below in conjunction with FIG. 10B.

The device of FIG. 8 is a "point-plane" ONO which consists of semiconductor layer 65, oxide layers 66 and 67, deposited metal layers 68 and 69, and electrodes 70 and 71. It is noted that metal-to-oxide contact is restricted to a limited portion of the upper face of oxide layer 66 by reduced "point" metal layer 68. Accordingly, the effective electrode contact area of the device is essentially that of the smaller metal contact 68, and the effective behavior of the device is that of an ON.

The device of FIG. 8 is useful in circuits requiring relatively small mean capacitance values, such as may be required in circuits operating at high microwave frequency. Assume, for example, that the circuit requirements indicate a mean capacitance value of the order of 1 micromicrofarad. The maximum capacitance for an ONO having an oxide layer thickness of $10^{-5}$ centimeter, is about $10^5$ micromicrofarad per square centimeter. Accordingly, to produce a device having a capacitance of the order of 1 micromicrofarad, the contact area must be reduced to the order of $10^{-5}$ square centimeter. This is readily achieved in a device of practical size in accordance with FIG. 8. The same method is, of course, applicable to other devices herein, unsymmetrical as well as symmetrical.

Another method for reducing the mean value of C is by use of laminates as, for example, the device of FIG. 10B. In such a configuration, the use of two or more series units results in an accompanying decrease in the effective mean associated capacitance, again while resulting in a device of reasonable cross-sectional area.

A method of coupling a parametric device of this invention in a waveguide is seen in FIG. 9. Shown in this figure are portions of waveguide wall 75, to which device 76 of ONO configuration is contacted, the free surface of device 76 being contacted in turn by large-area metal plate 77. This mounting is known to those skilled in the art and essentially represents a capacitative coupling to the energy in the waveguide. Coupling of parametric devices of this invention is simplified by the fact that direct electrical connection to the semiconductor is unnecessary. Devices may even be glued in place, although in such instance it is desirable that the glue layer be kept very thin so as not to introduce substantial additional series capacitance, thereby impairing the effective sensitivity of capacitance as a function of applied voltage.

Reference is had to FIGS. 10A and 10B in the discussion of the relative merits of a composite device of laminar structure. The device of FIG. 10A is of the usual ONO configuration, with dimensions suitably exaggerated for comparison purposes. This device, 80, consists of semiconductor region 81, here considered to be of N-type conductivity, and oxide regions 82 and 83. As with other devices of this structure discussed above, electrodes 84 and 85 make electrical connection with oxide layers 82 and 83 via deposited metallic layers 86 and 87.

Device 90, of FIG. 10B, includes N-type semiconductor regions 91, 92 and 93 and oxide layers 94, 95, 96 and 97. Electrodes 98 and 99 make electrical connection with oxide layers 94 and 97, respectively, via deposited metal layers 100 and 101. The devices depicted in FIGS. 10A and 10B are of the same overall dimensions and include the same total oxide layer thickness, as well as the same total semiconductor thickness. In the device depicted in FIG. 10B, each of oxide layers 94 through 97 is one-half the thickness of each of oxide layers 82 and 83 of the device of FIG. 10A. By the same token, each of semiconductor regions 91 through 93 of FIG. 10B is equal in thickness to one-third that of region 81 of the device of FIG. 10A.

In comparing the two devices of FIGS. 10A and 10B, it is assumed that the applied voltage is just large enough so that the depletion layer or layers is equal to the thickness of the semiconductor region or regions of concern.

It is readily seen that since the thickness, $t$, of a depletion layer varies as $V^{1/2}$, only one third of the applied voltage is required to produce this condition in the device of FIG. 10B. For the general case, assuming $m$ layers of the semiconductor all of equal thickness, the required voltage is $1/m$, that required for a device of the ONO configuration of the same overall dimensions. Although the required voltage is reduced as indicated, the actual capacitance variation is the same. Accordingly, a laminar structure, for example, of the nature of the device of FIG. 10B, has a far greater voltage sensitivity for a given impedance and hence has a superior figure of merit, F, for a given applied pump voltage.

Devices of the laminar structure are useful also as indicated above in the discussion relating to the point-plane device of FIG. 8 in that mean capacitance can be reduced for a given voltage sensitivity and overall dimensions. By the use of such laminae, oxide and semiconductor layers of a given thickness can be built up and the area can be increased so as to provide the same capacitative impedance at larger area, thus resulting in higher power handling and ease of construction. Such a device can be built up to a volume designed to occupy all or a large portion of a waveguide or coaxial line cross-section so as to couple directly to the power in the line without the need for strip or other auxiliary coupling. Although an advantage to be gained in the construction of laminar devices resides in the comparatively large overall dimensions of the initial structure, such devices can be produced by sintering or otherwise bonding together individual devices of the ONO configuration.

The major dimensional considerations in obtaining a high figure of merit, F, apply to all devices of this invention, ONO's and laminar structures alike. It is indicated that oxide or other dielectric thickness, $t_1$, is to be small. Mean space-charge thickness, $t_0$, should be large relative to $t_1$ and also relative to total semiconductor thickness $t_2$. These general requirements suggest the use of vapor deposition, reduction from a gaseous compound and other suitable means for providing dielectrics of high or controlled resistance. Semiconductor layers may be produced by many procedures known to those skilled in the art. One such procedure, which has not found broad commercial use, is evaporation of the semiconductor layer as well as the oxide. Silicon, for example, is readily evaporated, as is silica. Layer thicknesses of both materials of the order of $10^{-5}$ centimeter, are feasibly produced by evaporation.

In FIG. 11 there is depicted a block diagram showing a common circuit configuration for use with one of the devices herein operated as a parametric amplifier. For convenience, exemplary frequencies are indicated. In this figure, a pump signal is applied to device 105 by a 12-kilomegacycle source 106 which may be a klystron. The signal to be amplified, here assumed to be of a frequency of 6000 megacycles, is received at antenna 107, then passes through circulator element 108, which may, for example, contain a ferrite magnetic rotating element together with suitable waveguide section in which the signal is rotated so as to be directed through selectively attenuating 12,000 megacycle filter 109 and thence to the parametric amplifier 105, where the signal is amplified. The signal is then directed back through filter 109, which attenuates the 12,000 megacycle pump frequency, and thence to circulator element 108, rotation there being sufficient to direct the amplified signal to crystal mixer 110. Local oscillator 111, operating at a frequency of 6060 megacycles or 5940 megacycles, also feeds into crystal mixer 110 so as to result in demodulation of the 6000 megacycle signal to an IF frequency of 60 megacycles. From there it is indicated that the IF frequency, still including the modulation signal, if any, is fed into intermediate frequency amplifier 112. The remainder of the circuit is not indicated but might include a further demodulating stage in which the IF frequency is removed, resulting in detection of the modulating frequency, which in turn may pass through one or more amplification stages before use.

FIG. 12A is a cross-sectional view of a typical adjustable waveguide structure containing a device of this invention. The structure shown is of the general coaxial line coupled type. In operation, a signal, for example, of a frequency of 6 kilomegacycles, is introduced into waveguide 120 through port 121, which is coupled to another section, not shown, generally including both a filter and a circulator, for example elements 109 and 108 discussed in conjunction with FIG. 11. The signal then passes through adjustable iris 122 into waveguide section 123, where it is introduced into the parametric device included within housing 124. Pump energy from source not shown is introduced into waveguide section 123 through port 125, which waveguide section is supplied with tuning plunger 126. Coupling is of the coaxial line type making use of line 127 within outer housing 128 and provided with tuning plunger 129. Waveguide 130 completes the coupling. Elements 131, 132 and 133 serve only a mechanical purpose and are part of the mounting for the device within detail 124.

FIG. 12B is a sectional view of detail 124 showing parametric device 134 held in position by metal elements 131 and 135, which latter passes through cap 132. Outer ceramic housing 136 completes the enclosure.

The equivalent effect of a laminar structure can be obtained in a composite device of matrix configuration, such as those depicted in FIGS. 13A and 14A. These devices are exemplary of a class utilizing fine particles of flake or other configuration. These particles consist of an inner semiconductor region and generally have an outer oxide or other dielectric coating, although the dielectric medium need not be an integral part of each particle and may be produced as a separate layer intermediate the particles. Such matrix devices may be furnished in the form of plastic tapes, similar in form to magnetic recording tapes, or may be in the form of a somewhat more rigid structure.

FIG. 13A depicts such a matrix device 140 consisting of individual particles 141, one of which is shown in detail in FIG. 13B. Each such particle includes an inner semiconductor region 142 and an outer oxide or other dielectric layer 143. For the device depicted, particles 141 are actually bonded together by sintering. Electrical contact is made to the under surface of the structure via evaporated metal layer 145. Contact may be made to the upper surface by a point, roller or other fixed or movable electrode not shown.

The device 140 of FIG. 14A is of a structure alternative to that of FIG. 13A and includes particles 151 of flake configuration shown in detail in FIG. 14B. Each such flake consists of a semiconductor region 152. In the device shown, individual flakes 151 are bonded together and electrically insulated by use of a low-melting glass 156, typically of a composition disclosed in copending U.S. application Serial No. 798,192, filed March 20, 1959. Bonding may be achieved by dispersing particles 153 in the powder or molten medium or by precoating followed by heating where required and, finally, by cooling. Electrode connection is made via metal layers 154 and 155. Use of two such layers 154 and 155 is illustrative only and is not specific to the device depicted. Either device 140 (FIG. 13A) or 150 may make use of one or two broad area contacts.

The main advantage of the matrix-type device exemplified by those shown in FIGS. 13A and 14A as compared to the laminar structure is ease of manufacture. On the other hand, devices of the latter type afford a closer degree of control over dimensions which may affect increased manufacturing cost. Simple non-critical fusion or sintering procedures are used to bond the individual particles in matrix devices, each acting as separate parametric devices, into a composite body. Such devices, of course, have the general advantages ascribed to the laminar devices, including, for example, large voltage sensitivity. Such devices are easily tailored to give any desired mean circuit capacitance. Since, as discussed above, it is desired that the thickness of oxide or other dielectric material $t_1$ be kept small, the particles should be packed closely. This is easily achieved by either of the techniques discussed. From a design standpoint, the platelet particles of FIG. 14A are preferred. To assure maximum voltage sensitivity, these platelets 152 should be oriented normal to the applied voltage.

A large advantage realized by the inherently great voltage sensitivity of capacitance in the matrix-type device is the resultant relaxation on requirements of crystal perfection. The use of such configurations also obviates the need for very thin self-supporting structures such as those which may be required for certain of the single symmetrical or unsymmetrical devices.

The phenomenon of excess carrier generation in an ONO configuration has been described in general terms above. Numerical values and suggested uses of this effect are here discussed. When a D.-C. voltage is applied to an ONO configuration of, for example, N-type silicon, and silicon dioxide of fairly high resistivity, for example, of the order of $10^{16}$ ohm-centimeters, the generation and accumulation of carriers in the silicon may cause a large portion of the applied voltage to lie across the two oxide layers, so that there is a dipole layer of charges at each oxide silicon interface. The quantity of plus or minus charge in each layer depends primarily upon the applied voltage across the device. When the potential is removed, the plus or minus charges in the silicon are released, so flowing toward each other and recombining until equilibrium is restored. Biasing in this manner results in a much larger concentration of thermally generated uncombined holes and electrons than are normally present.

An estimate of the maximum concentration of thermally generated carriers is made as follows:

Let Q be a charge of given polarity stored by the capacitance, C, consisting of the two oxide layers in series. Let $t_1$ be the total thickness of the oxide layers. Then:

$$Q=CV=CEt_1=\frac{\epsilon_1 A}{t_1}\cdot Et_1=\epsilon_1 AE \quad (17)$$

where

E is electric field in oxide in volts/centimeter
$t_1$ is oxide thickness in centimeter
A is area in centimeter $^2$
C is capacitance in farads
$\epsilon_1$ is dielectric constant in farads/centimeter.

Let $E_m$ be the maximum field the oxide can sustain without breakdown. Then, $Q_m$, the maximum charge, is $$Q_m=E_m\epsilon_1 A \quad (18)$$

If the thickness of the silicon is $t$ and its area is also A, then the volume is $A\cdot t$ and the mean number $N_{max}$ of electron-hole pairs per unit volume is:

$$N_{max}=\frac{Q}{Ate}=\frac{E_m\epsilon_1 A}{Ate}=\frac{E_m\epsilon_1}{te} \quad (19)$$

where $e$ is the electronic charge in coulombs. For thermally grown or anodically grown $SiO_2$ layers on silicon, $E_m$ is greater than $5\times10^6$ volts per centimeter, $\epsilon_1$ is about $35\times10^{-14}$ farads per centimeter. Therefore:

$$N_{max}\geq\frac{(5\times10^6)(35\times10^{-14})}{t(1.6\times10^{-19})}\geq\frac{1.1\times10^{13}}{t} \quad (20)$$

If $t$ is $10^{-3}$ centimeters, which is easily achievable with ordinary techniques, $N_{max}\cong1\times10^{16}$ carriers per cubic centimeter. If $t$ is $10^{-4}$ centimeters, which is achievable with more refined techniques, $N_{max}\cong1\times10^{17}$ carriers per cubic centimeter.

It has been mentioned that other dielectric materials are suitably substituted for, for example, silicon dioxide. Particularly useful materials include the low-melting glasses of the arsenic-sulfide or arsenic-selenide system containing thallium, described and claimed in copending U.S. application Serial No. 798,912, filed March 20, 1959, now United States Patent 2,961,350. Another such series of glasses of use here is described in copending U.S. application Serial No. 817,747, filed June 3, 1959, now United States Patent 3,024,119. In addition to having the unusual property of gettering or otherwise immobilizing ionic impurities on the surface of the semi-conductor material (such impurities otherwise being deleterious in resulting in drift of electrical characteristics) these materials have good dielectric properties, the dielectric constants being generally of the order of from $4\epsilon_0$ to $12\epsilon_0$, where $\epsilon_0=8.85\times10^{-14}$ farads/centimeter. Maximum fields that can be sustained, $E_m$ are of the order of $5\times10^7$ volts per centimeter. By the use of such materials it is possible to produce a mean number, $N_{max}$, of generated electron-hole pairs per unit volume of the order of $3\times10^{17}$ for a semiconductor thickness, $t$, of the order of $10^{-3}$ centimeters. For a thickness of the order of $10^{-4}$ centimeters, $N_{max}$ may be about $3\times10^{18}$. Such excess carrier concentrations are, of course, much greater than can be obtained by techniques such as biasing P–N junctions in the forward direction. As discussed herein, a steady excess electron-hole pair concentration can be produced by an A.-C. voltage. The mean concentration of such generated carriers can be a large fraction of the values indicated for the D.-C. bias systems discussed above.

In addition to serving as the basis for a class of devices discussed in conjunction with FIGS. 15 et seq., the carrier generation phenomenon has other uses. For example, it can be used to produce emission of recombination radiation of a wavelength corresponding to direct recombination of electron-hole pairs, that is, of a wavelength of the order of the energy gap. If suitable activators serving as recombination centers are present, the emitted energy may be of a longer wavelength. Suitable additives include those known to produce recombination centers in various semi-conductors. The low efficiency of such radiation demands large electron-hole concentrations for devices operating on this principle. It is indicated that the efficiency of recombination wavelength devices may be further increased by having so large a hole-electron pair concentration that ordinary recombination centers are saturated, such centers corresponding to longer wavelengths and shorter recombination times, so increasing the proportion of direct recombination. Transparent or grid-form electrodes are used in such devices to permit the radiation to escape.

Excess carriers created under the influence of an applied field may be used as an absorptive medium to control or vary the intensity of radiation transmitted through an ONO. As an example, since high purity silicon is transparent to wavelengths larger than those corresponding to the energy gap, a voltage controlled radiation absorber operating in such a frequency region may be made.

In yet another use, where the semiconductor region is of high resistivity, or of intrinsic conductivity, accumulated carriers produced under the influence of an applied field can greatly decrease its resistivity in the region between the oxide layers. Accordingly, the current in an external circuit including such a device may be varied by applying A.-C. voltage across the oxide layers. Utilizing a circuit containing such a device operating in this manner, a D.-C. meter and D.-C. source may be used to measure the A.-C. voltage across the oxide layers.

The group of devices now discussed in conjunction with FIGS. 15 through 17 depend for their operation on a variation of capacitance with accumulation layer in contrast with many devices discussed above, which depend mainly on depletion layer capacitance variation. To define these terms it is convenient to refer back to FIG. 3, which shows potential distributions resulting from the application of a D.-C. potential to an extrinsic conductivity device of the ONO configuration, both initially (curve 30) and in the steady state (curve 31). It is seen from that figure that when a potential difference, V, is first applied, electrons, the majority carriers in N-type material, migrate in the direction of the positive terminal. These carriers accumulate in the silicon at the silicon-silicon oxide interface at the positive side of the device. Because this layer is a region in which charge is stored, there is an associated capacitance to which reference is had as the accumulation layer capacitance. In many of the devices discussed above, in which semiconductor layers of fairly low resistivities (for example, of the order of 0.01 ohm-centimeters) are used, this capacitance associated with accumulation layer charge storage at moderate voltage is relatively large by comparison with other series capacitances in the device (depletion layer plus oxide layer). This capacitance due to accumulation layer was for this reason neglected in many of the calculations presented. However, at relatively low voltages, and particularly in materials of fairly high resistivity, this capacitance can be small and very voltage-sensitive.

Still referring to FIG. 3, migration of majority carriers toward the positive terminal under the influence of the applied potential field has resulted in the depletion layer on the negative or reverse bias side of the device. This depletion layer consists of positively charged donor ions in a region in which the majority carrier concentration (electrons) is smaller than its normal value. The thickness, $t$, of the depletion layer varies as $V^{1/2}$ and its capacitance varies as $V^{-1/2}$, that is, the capacitance of the depletion layer decreases as V increases. Most of the devices thus far discussed are dependent for their voltage sensitivity upon this phenomenon.

FIG. 15 is an energy band diagram for an ONO unit biased like that of FIG. 3, in which $E_c$ denotes energy of the bottom of the conduction band, $E_v$ energy of the top of the valence band, and $E_F$ the Fermi level. Cross-hatched regions 160 and 161 denote the oxide layers, here assumed to be perfect insulators. The concentration of holes, $p$, or electrons, $n$, at equilibrium at any point in the semi-conductor is governed by the following equations:

$$n = n_i e \frac{-q(E_c - E_F)}{kT} \quad (21)$$

$$p = n_i e \frac{-q(E_F - E_v)}{kT} \quad (22)$$

where $$\frac{kT}{q}$$

is in volts. For silicon, this value is 0.025 volt at room temperature. In Equations 21 and 22 the symbol "$q$" instead of "$e$" has been used for electronic charge, to distinguish it from the "$e$" denoting "exponential." $(E_F - E_V)$ is the energy difference between the top of the valence band and the Fermi level in volts, and $(E_c - E_V)$ is the energy difference between the top of the valence band and the bottom of the conduction band in volts, both values considered positive.

In intrinsic material, the following relationship obtains:

$$np = n_i^2 \quad (23)$$

The Fermi energy is a reference level at which the hole and electron concentrations are equal. Thus, when the material is N-type, electrons are the majority carriers, and the conduction band level, $E_c$, is closer to the Fermi level, $E_F$, than is the valence band level, $E_V$. Thus, in the accumulation-layer, 162, in FIG. 15, there are extra majority carriers and $E_c$ and $E_V$ are correspondingly curved downward.

Conversely, at the negative interface, the energy levels are curved upward, denoting a deficiency of electrons, producing depletion layer 163. If the applied potential difference, V, is great enough, a third type of charge-storage region appears. This is the inversion layer, denoted 164 in FIG. 15. In this region the valence band level, $E_V$, has bent upward far enough so that it is closer to the Fermi level than is $E_c$. As a result, excess holes are demanded in this layer. They arise from thermal generation processes in the body or surface of the semiconductor. The capacitance associated with the inversion layer resembles that of the accumulation layer in the general form of its voltage sensitivity. Both of these capacitances, that associated with the accumulation layer and that associated with the inversion layer, increase exponentially with voltage. Since the capacitance of the depletion layer decreases with an increase in voltage, the effect of accumulation plus inversion layer capacitance is to offset such change.

As discussed in conjunction with FIG. 3, it has been noted that the steady state potential distribution across a device including a layer of semiconductor material exhibiting extrinsic properties always exhibits some depletion layer capacitance. In intrinsic material there is no depletion layer capacitance, and the effect of applied potential is to produce an accumulation layer capacitance at each interface. This situation is represented by the curve for $\lambda = 1$ in FIG. 4.

The device of FIG. 16 is illustrative of a class which depends for its voltage sensitivity primarily on accumulation layer or, in certain instances, on accumulation layer plus inversion layer capacitance effects. This figure is now considered to represent an OIO (oxide-intrinsic-oxide) configuration. This device, 170, also in accordance with the convention described above, is discussed in terms of a semiconductor layer of intrinsic material, 171, having two opposite layers, 172 and 173, of silicon dioxide. Electrode contact is made to oxide layers 172 and 173 via deposited metal layers 174 and 175 by electrodes 176 and 177, respectively. In one species of this device the thickness of layer 171 is equal to one Debye length.

With zero bias the capacitance-voltage relationship for the device of FIG. 16 is given by the curve $\lambda = 1$ on FIG. 4. When a voltage is applied, two accumulation layers, one at each silicon-oxide interface, are produced. One of these layers is produced by accumulation of holes (on the negative side), the other by electrons. Both capacitances increase with increasing over-all applied voltage so that their effects are additive. By contrast, in a device of the ONO configuration for fairly high carrier concentration, capacitances produced at opposite interfaces, the one a depletion layer, the other an accumulation layer, respond oppositely to a change in voltage.

The capacitance-time relationship for an applied sinusoidal signal in a device of the OIO configuration is shown in FIG. 17. In this figure, applied voltage is shown as curve 180 on coordinates of voltage against time, while resulting capacitance including the fixed capacitance effect of the oxide layers, is shown as curve 181 on coordinates of capacitance on the same time scale. As in the ONO configuration, the frequency of the capacitance relationship (curve 181) is seen to be twice that of the applied voltage (curve 180). The maximum value of capacitance C is essentially that of the oxide layers. An estimate of the effectiveness of a device of the OIO configuration as a parametric amplifier is afforded by Equation 9.

An important feature of capacity effects associated with accumulation layers is that, since these are majority carrier devices, thermal generation of minority carrier does not enter into the behavior of the devices. Hence, such devices are free of frequency effects associated with carrier generation. In intrinsic material both holes and electrons are regarded as majority carriers.

In the operation of an OIO, there is no requirement comparable to the demanded generation of minority carriers in an ONO operated at large enough applied voltage to produce an inversion layer. However, under certain circumstances, the OIO does require generation of excess carriers, that is, in excess of those present at equilibrium at zero applied potential. This occurs when the applied voltage is so great that the charge required to be stored in the accumulation layer exceeds the total number of carriers in the semi-conductor. Under this condition, the excess carrier generation results in an increase in total carriers. A benefit realized under this condition is a decrease in the resistance of the semiconductor during the parts of the pump voltage cycle when the voltage is decreasing from its maximum value. This effect leads to higher figure of merit.

The voltage sensitivity of capacitance in an OIO may be increased by providing a D.-C. bias so as to raise the operating points of the two OI junctions to steeper regions on the $\lambda = 1$ curve of FIG. 4. Referring to this figure, for example, in the range of from $Y = 0$ to $Y = \pm 2$, the slope is substantially smaller than that at $Y = \pm 10$. Application of a D.-C. bias of 20Y, or about 0.5 volt at room temperature increases the operating levels of the two OI junctions to $-10$Y and $+10$Y, respectively. A superimposed A.-C. voltage, such as the pump voltage of a parametric amplifier, results in variations in C in the same sense about both opearting points with instantaneous variation in such A.-C. voltage. In a device of the OIO configuration, or in any device dependent upon a variation in stored charge due to the accumulation of carriers, the fixed oxide capacitance should usually be at least as large as the largest value of the accumulation layer capacitance. This requirement is easily met. For example, the zero-bias capacitance of an intrinsic silicon accumulation layer is about $4 \times 10^{-10}$ farads per square centimeter. A layer of silicon dioxide about 350 A. thick has a capacitance of about $10^{-7}$ farads per square centimeter, which is larger by a factor of 250. For a 350 A. layer of silicon dioxide, or other comparable dielectric on intrinsic germanium, the difference is about five times greater than for silicon dioxide on silicon.

Devices operating primarily by reason of variation in capacitance due to accumulation layer charge have been discussed above. The limiting effects of accumulation layers under certain circumstances on devices dependent for their operation chiefly on the presence of a depletion layer have also been discussed. Under certain circumstances, accumulation layer capacitance can supplement the effect of depletion layer capacitance.

In accordance with such operation, in a device of the ON configuration, such as that depicted in FIG. 6, the predominant capacitance is depletion type when the oxide is negative and accumulation type when positive. A representative curve indicating such operation is that shown for $\lambda=10^{-3}$ on FIG. 4. This curve corresponds to silicon having a resistivity, $\rho$, of about 5 ohm-centimeters. For an unbiased unit, a pump voltage of frequency $f$ produces a capacitance variation of the same frequency around the zero voltage value ($Y=0$ on FIG. 4). It is seen that two types of capacitance variation reinforce one another on alternate halves of the voltage cycle.

From FIG. 4 it is seen that for low and moderate applied voltages, accumulation layer capacitance can be much more voltage-sensitive than the depletion layer capacitance. Hence, for best voltage sensitivity of capacitance it is desirable to operate in the accumulation region at as high a capacitance value as possible consistent with the requirement that the maximum capacitance of the charge region be comparable to, or smaller than, the capacitance of the oxide layer. This operating condition may be achieved in two ways. These alternatives are discussed in relation to FIGS. 18 and 19.

FIG. 18 depicts on ON device, 190, consisting of N layer 191, O layer 192, deposited metallic layers 193 and 194, and electrodes 195 and 196. The circuit indicated is illustrative only, as are the other circuits depicted in the figures. The purpose is generally to show a biasing source and/or serve as the basis for discussion of operating characteristics. Particularly at higher frequencies it is usually preferable to make use of waveguides and associated structures. This circuit includes D.-C. voltage source 197 and transformer coupling 198, through which latter the pump voltage is impressed across device 190. Conductive paths 199, 200 and 201 complete that portion of the circuit depicted. Signal input not shown may feed into transformer 198 or into a separate input, not shown. In operation, forward biasing the ON junction (oxide region positive) results in an increase of voltage sensitivity of the resultant accumulation layer during alternate half-cycles of the applied pump signal. As an example, referring again to FIG. 4 and assuming a semiconductor of such carrier concentration that $\lambda=10^{-2}$, and an oxide capacitance in $$\frac{C}{C_0}$$

units of $10^3$, use of a bias of about $+8Y$ (that is, about 0.2 volt forward) results in raising the mean accumulation capacitance value to about $5\times10^2$. A further increase in bias of about 2Y units raises this mean capacitance value to greater than $10^3$, thereby resulting in a change in total capacitance by a factor of about 2.

In FIG. 18, if the ON device is biased reverse (oxide negative), then the mean capacitance and resistance of the semiconductor are reduced, leading to a smaller RC time. Under this bias direction the depletion layer capacitance becomes controlling.

In using large reverse bias voltages to produce depletion layer capacitance, the phenomeon of avalanche breakdown in the semiconductor must be considered. If the field in the semiconductor exceeds a critical value, which for silicon varies from about $1.5\times10^5$ volts per centimeter at a donor concentration $n$ of $10^{15}$ carriers per centimeter cubed to about $6\times10^5$ volts per centimeter at $n$ of $10^{18}$ carriers per centimeter cubed, then large numbers of electron-hole pairs are produced by an avalanche mechanism. This breakdown does not physically damage the silicon. In fact it can be utilized to produce sharp changes in capacitance in an ONO or ON configuration, as the process is extremely rapid. Details of the phenomenon are described by K. G. McKay, Physical Review, volume 94, page 877 (1954).

FIG. 19 illustrates a second method of providing this effect. The device 210 here depicted consists of oxide layer 211 and semiconductor layer 212, the latter including regions 213 and 214 here considered to be of $N^+$ and N conductivity, respectively. Consistent with usual practice, the superscript "+" modifying a "P" or "N" denotes a substantial increase in carriers of the designated type within a given device or body, typically of the order of at least one magnitude greater. As in the other devices described, electrodes 215 and 216 make contact, respectively, with oxide layer 211 and semiconductor layer 212 via deposited metal layers 217 and 218. The circuits schematically indicated include transformer coupling 219, into which the pump energy is introduced, and conduction paths 220 and 221. In the $ON^+N$ device the low resistivity $N^+$ region near the oxide provides a greater sensitivity of accumulation layer capacitance to applied voltage than is otherwise possible at zero bias in material of donor concentration N.

As is known to those skilled in the art, the $N^+$ conductivity of region 213 corresponds to a bending downward of the energy bands which may be made equal to a given field resulting from a specified applied D.-C. bias. For the same conditions of operation discussed in the description of FIG. 18, in which the field was produced by a 0.2 volt bias, it is necessary to increase the donor concentration for $N^+$-region 213 relative to N-region 210 by a factor of about $10^3$ (or with reference to FIG. 4, to a $\lambda$ value of $10^{-5}$) in a surface layer corresponding to a Debye length, L, at this concentration. Diffusion techniques for accomplishing this are well known for the common semiconductor materials, such as silicon and germanium.

The thermal oxidation process itself, which may be used to produce oxide layer 211, can be controlled to produce such an $N^+$ layer. A detailed account of methods of producing thermally grown layers of silicon dioxide on silicon is given by M. M. Atalla, E. Tannenbaum, and E. J. Scheibner, in Bell System Technical Journal, volume 38, page 749 (1959). Methods are described for minimizing the number of surface states at the interface between oxide and silicon and for controlling the curvature of the energy bands at the interface.

In devices utilizing accumulation layer capacitance for parametric amplification it is desirable to have a large carrier concentration so as to reduce the series resistance and yet a low capacitance so as to have a low RC product and to have a mean capacitance less than that of the oxide. However, low accumulation layer capacitance is favored by low carrier concentration. These conflicting requirements can be resolved by using a layer of low carrier concentration adjacent to the oxide while having a large carrier concentration in the remainder of the semiconductor wafer. Examples of such structures are: $ONN^+$, OIN, OINIO. The device of FIG. 19 may be considered as representing the first two modifications and that of FIG. 22, the third. The thickness of the low carrier concentration layer is preferably not larger than a Debye length L for the carrier concentration in the layer.

Reference is made to FIG. 20 in describing the use of a D.-C. bias on a device of the ONO configuration for increasing voltage sensitivity. This figure shows device 230, consisting of N-type region 231, oxide layers 232 and 233, deposited metal layers 234 and 235, and electrodes 236 and 237. A D.-C. bias source 238, as well as a transformer coupling 239 for pump energy input, are indicated. The circuit is completed by conductive paths 240, 241 and 242. With reference again to FIG. 4, assuming a semiconductor layer 231 of such carrier concentration that $\lambda=10^{-2}$, it is seen that application of a D.-C. voltage of about 20Y, or 0.5 volt at room temperature, results in a condition under which the inversion layer capacitance dominates the negative ON junction between region 231 and 233 while the accumulation capacitance dominates at the positive ON junction intermediate regions 231 and 232. Since both capacitances vary in the same direction with varying instantaneous values of applied A.-C. pump energy, the response of such a D.-C. biased device of the ONO configuration is seen to be similar to that of a biased OIO device. Further, the series resistance of the biased ONO is lower than that of the OIO.

Referring to the biased ONO device of FIG. 20, it is evident that if the D.-C. bias is large enough to produce a depletion layer extending over the entire silicon body, or nearly so, then the series resistance in the semiconductor is very small and the figure of merit of the device as a parametric amplifier is much improved over the value for no bias. The bias also decreases the mean capacity so that the RC product is made smaller by reducing both R and C. As pointed out elsewhere herein, a low RC product is desirable for high frequency operation. A unique feature of an ONO device is that it is feasible to consume the entire semiconductor body with a depletion region without danger of "punch-through."

Reference is had to FIG. 21 to illustrate a similar operating condition for a biased OIO device 250. This device comprises I region 251, oxide regions 252 and 253, metal layers 254 and 255, and electrodes 256 and 257. D.-C. bias source 258 and transformer coupling 259 are connected with device 250 via conductive paths 260, 261 and 262. Referring now to FIG. 4, it is seen that a D.-C. bias resulting in a potential of the order of 8Y (0.2 volt at room temperature) causes the device to operate about a total mean capacitance value of $4C/C_0$, which is on the straight line portions of the $\lambda=1$ curve on that figure. It is seen that voltage sensitivity is thereby improved.

FIG. 22 illustrates yet another modification of the ONO configuration. The device 270 depicted consists of semiconductor region 271, here considered as including a center layer 272 of $N^+$ conductivity and two outer layers 273 and 274 of N conductivity. Electrode connection is made to device 270 by electrodes 275 and 276 via metal layers 277 and 278. The device is shown as a portion of a schematic circuit including a D.-C. bias source 279, although as discussed herein, use of this device is not so limited. The particular circuit shown also includes transformer coupling 280, as well as conduction paths 281, 282 and 283.

A D.-C. bias voltage can be used to produce an inversion layer at one N–O junction and an accumulation layer at the other N–O junction. As discussed above, the capacitances of these layers react in the same sense to an applied voltage. If no D.-C. bias is used the device operates essentially like an unbiased ONO.

FIG. 22 may also represent an OINIO structure in which I-layers about a Debye length, L, in thickness are adjacent the oxide layers. The D.-C. bias has advantages pointed out above for OIO structures. The bias may be about 0.1 volt or more for an OINIO and about 0.5 volt or more for an $ONN^+NO$ device in which the N regions have a $\lambda$ value of about $10^{-3}$.

As discussed above, the device 270 of FIG. 22 is illustrative of a class of device which can tolerate greater thickness while minimizing impairment of figure of merit, F.

In the following discussion, the variables $t$ and $\rho$ are as described above and have reference solely to regions 273 and 274 of device 270 here considered to be N-type. The same variables followed by an asterisk have reference to region 272 considered $N^+$ and represent the same parameters in that region.

Consider a wafer of thickness $t^*+2t$ having a thin layer at each surface of thickness $t$ and resistivity $\rho$, and having a uniform bulk resistivity $\rho^*$ appreciably less than $(\rho t/t^*)$. Then the resistance resides almost entirely in the mean thickness, $1.5t$, of the layers and the mean space charge layer thickness is $0.5t$. Equation 15 becomes:

$$F=\frac{1}{4\pi\epsilon_2\rho}\left(1+\frac{0.5t}{\alpha t_1}\right)\left(\frac{0.5t}{1.5t}\right)$$

$$F=\frac{1}{12\pi\epsilon_2\rho}\left(1+\frac{t}{2\alpha t_1}\right)$$

Taking $t=6\times10^{-5}$ centimeter and $\rho=0.5$ ohm-centimeter, which corresponds in silicon to a space charge thickness equal to $t$ at 2 volts, and $t_1=10^{-5}$ centimeter, F is found to be of the order of $2\times10^{11}$ for silicon. The cut-off frequency in cycles per second is about the same value, that is, about 100 kilomegacycles. The thickness $t^*$ can be as great as of the order of $6\times10^{-3}$ centimeter by heavily doping the bulk of the semiconductor. Also, the C–V curve for this device approximates the form of curve 21 in FIG. 2, because once the space charge region reaches the low resistivity material there is little further widening with increased voltage.

As noted above, a thermal oxidation treatment advantageously utilized to produce the oxide layers in devices of the ON configuration may be utilized to simultaneously produce an $N^+$ region immediately under the oxide. Under certain conditions the same thermal oxidation treatment may result in an inversion layer under the oxide layer. Where the configuration is symmetrical, this may result in a device of the ONPNO or the OPNPO type. The behavior of such devices is similar to that described for the prototype ONO, and reasonable approximations of circuit parameters of concern may be based on the same equations. Since the O regions of any of the devices discussed are of very high resistivity and in the general case are ideally perfect insulators, there is no objection to total enclosure of the device by such an oxide layer. Such treatment protects the ON or other junctions from ambient effects in the same manner as for transistors and diodes. Typical silicon dioxide thicknesses are of the order of from $10^{-5}$ to $10^{-4}$ centimeter. Such thicknesses may be produced by heating in air at temperatures of from 1000° C. to 1300° C. for periods of from several hours to days, as described by M. M. Atalla (reference cited above). Well-known manufacturing techniques in use or suggested for use for other semiconductor devices may be adapted to the manufacture of the devices herein. Other procedures suggest themselves. Suitably, metallic contact may be made to ONO devices by thermal compression bonding, by gold bonding, by solder bonds, or by evaporation of gold, chromium or aluminum followed by soldering, pressure contact, or thermal compression bonding.

The use of compositions included in two new groups of low-melting glasses disclosed in copending application cited above has been discussed. Certain of these glasses, in addition to providing good dielectric properties, form extremely adherent bonds with a variety of materials, and, since they are easily wetted by a class of organic media including the perfluorocarbons, are particularly useful in the formation of composite particle type devices such as those discussed in conjunction with FIGS. 13A and 14A.

In general, the devices of this invention may utilize any semiconductor material having a resistivity level of the order of $10^{-3}$ ohm-centimeter or greater. Use of materials having resistivities substantially greater than $10^5$ ohm-centimeter may unduly limit cut-off frequency, but may be permissible for frequencies below about 10 megacycles. Such materials include the elemental and oxide-type semiconductors, silicon, germanium, copper oxide, as well as the binary 3–5 compounds such as indium-antimonide and gallium-arsenide and the ternary and quaternary materials recently developed. See J. H. Wernick, IRE, Professional Group on Electron Devices, Transactions; ed. 6, no. 2, April 1959. Preferred materials are single crystalline.

Still referring to suitable semiconductor materials it has been shown that low dielectric constants are desirable, particularly for high-frequency operation. In general, however, semiconductor materials evidence a narrow range of dielectric constant relative to resistivity. An increase in $\epsilon$ an order of magnitude above that of silicon to about 100 is easily offset by similar decrease in resistivity, so resulting in the same cut-off frequency.

Considerations of mobilities and carrier lifetimes are generally the same as for other semiconductor transducers, high-frequency operation indicating high values of both parameters. In general, carrier mobilities of at least 100 centimeters squared per volt-second are desired.

Aside from the leakage path dielectrics discussed above dielectric layers whether oxide or other material desirably evidence resistivities of the order of $10^{12}$ ohm-centimeters or higher.

As stated, many of the important design criteria applicable to the devices herein are dependent upon associated circuit characteristics rather than on the devices themselves. Exhaustive treatment of such circuit applications and parameters of concern is not considered necessary to this disclosure. Suitable circuits utilizing parametric devices of the variable capacitance type are well-known, as are associated design criteria. See, for example, H. Heffner, Microwave Journal, volume 2, page 33, March 1959, and W. E. Danielson, Journal of Applied Physics, volume 30, page 8, January 1959. An important characteristic of a device of the inventive class operated as a parametric amplifier is its static capacitance. It has been noted that this capacitance should be such that it matches the circuit in which the device is operated. In general, such considerations as applied to a single unit device herein, either of symmetrical or unsymmetrical configuration, dictates minimization of cross-sectional area normal to signal direction. At least one method of reducing effective cross-sectional area, and therefore static capacitance, in a single unit device has been indicated, i.e., point-plane device of FIG. 8. In general, for most circuit uses operating at high frequency the desirability of utilizing single unit devices having cross-sectional areas on the designated plane of a maximum of about .01 square centimeter is indicated. It is noted that the corresponding maximum tolerable static capacitance may be obtained in various of the composite structures including laminae and particle devices utilizing greater unit cross-sectional area.

Since in certain of the included inventive devices there is no requirement for a P–N junction, use may be made of certain naturally occurring and man-made semiconductors which have not yet proved amenable to conversion by use of extrinsic impurities.

As has been clearly indicated, reference to particular configurations, notably the ONO, is exemplary only. Although certain portions of the descriptive matter have been limited specifically to particular configurations, general reference to the ONO, except where otherwise indicated, is equally applicable to devices of the OPO configuration as well as to other variations including those herein discussed. More generally, P may be substituted for N and $P^+$ for $N^+$ in any of the structures depicted or discussed. For simplicity the dielectric layer has been discussed in terms of an oxide layer (thus the designation "O"). It has been indicated that certain other dielectric materials, including glasses, may be substituted. Other substitutions are apparent and are considered within the scope of this description.

Many of the devices have been discussed in terms of wire electrodes. Since, however, most efficient use in the wire operating frequencies may indicate use of waveguide structures, the need for wire leads is obviated. The disclosure is, therefore, not to be construed as limited to the use of any particular method of coupling. The relative dielectric to semiconductor thicknesses, as well as the overall dimensions shown in all the accompanying figures, are, of course, exaggerated. In certain instances it has been convenient to exaggerate one or another thickness, as, for example, in FIGS. 3 and 15, in which a direct comparison is made between the device and the potential distribution or applicable energy band configuration.

The desirability of utilizing total dielectric to semiconductor, or dielectric to semiconductor to dielectric thicknesses, of the order of $10^{-3}$ to $10^{-6}$ centimeter (this dimension of course applicable to each individual element in a laminar or other composite device), is indicated. The desirability of such dimensional order is premised on high-frequency operation (10 kilomegacycles to 100 kilomegacycles). Lower frequency operation may result in the design toleration of increased dimensions. It is considered that the devices herein may operate efficiently as parametric amplifiers to a low frequency of the order of 1000 cycles per second, in turn indicating the tolerability and oftentimes preference of overall dimensions in the direction of signal propagation of the order of 0.1 centimeter. By the same token, efficient operation at higher frequencies may be achieved by the use of smaller overall dimensions, generally feasible in self-supporting devices only. Accordingly, overall dimensions between electrode contacts of the order of $10^{-5}$ centimeter permits operation at frequencies of the order of 100 kilomegacycles. In this connection it has been noted that the noise level for any of the devices herein is decreased as the frequency of operation is decreased relative to the maximum cut-off frequency. Where possible, operation at a frequency of about one-tenth the maximum cut-off frequency is indicated where low noise is a primary consideration.

It has been shown that the total thickness of the oxide layer is desirably less than the thickness of the space-charge region. This generalization is, of course, dependent on relative dielectric constants for the dielectric layer and semiconductor charge layers. This requirement is generalized when expressed in terms of capacitance values. Accordingly, it is noted that the capacitance of the oxide layer should be larger compared to that of the space-charge regions. It is considered desirable, therefore, that any device herein be of a structure such that the oxide capacitance is about 10 times larger than the mean value of space-charge layer capacitance. Successful operation is possible, however, even if the oxide capacitance is as small as one-tenth of the space-charge capacitance.

The cross-sectional area of the inventive devices is determined primarily by the circuit requirements, chiefly in view of mean capacitance. In general, of course, an increase in such cross-sectional area increases the current carrying capacity of the device. This dimension of these devices is, therefore, determined by the required operating conditions of the particular circuit in which it is to be used. No preferred range has been specified, although it has been indicated that for certain high frequency use a generally desired order of mean capacitance is 1 to 0.1 micromicrofarad, in turn indicating an effective cross-sectional area of the order of $10^{-5}$ square centimeter. As indicated, such an effective cross-sectional area is readily achieved in a large device by use of the point-plane configuration discussed in conjunction with FIG. 8.

The devices herein have, of necessity, been discussed in specific terms. Certain of the parameters, both dimensional and circuit, are elemental in determining circuit rather than device efficiency. For example, the impedance of the device at microwave frequencies should approximate the characteristic impedance of the waveguide or coaxial line in which the device is mounted. This impedance, for microwave applications in the region of 6000 megacycles per second, is of the order of 50 ohms and this in turn dictates a mean device capacitance of the order of 0.1 micromicrofarad. Variation in such parameters is indicated by other circuit use. Other variations, in dimension, composition and configuration, are immediately apparent and are considered included within the scope of this disclosure. For example, a resistivity gradient is a complete substitute for a step gradient (e.g., in the ON+N device of FIG. 19). Also, the inventive devices have been discussed chiefly in terms of their use as parametric amplifying elements. Other uses have been suggested. For example, digital computers have been described based on the phase of the oscillation of a parametric P–N diode. This phase has two possible values, which designate the digit "0" or "1" in the computer. Still others are obvious to those skilled in the art. Such uses are considered included.

What is claimed is:

1. A parametric amplifier comprising at least one unit comprising in succession a first region of a dielectric material and a second region of a semiconductor material, said semiconductor material having a carrier mobility of at least 100 centimeters squared per volt-second, said two regions being in intimate contact, together with means for impressing a pumping field and a signal field across at least one said unit in a direction such as to encompass the said two regions and means for supporting an idler frequency, the pumping field being such as to vary the capacitance of the said device at a frequency such as to result in parametric amplification of the said signal field.

2. The device of claim 1 in which the said means includes a first electrical contact to the said first region and a second electrical contact to the said second region.

3. The device of claim 1 in which the said second region evidences varying resistivity in the said direction.

4. The device of claim 3 in which the resistivity is higher in that portion of the second region adjacent the said first region.

5. The device of claim 4 in which the said varying resistivity is in the form of a step gradient intermediate two portions of the said semiconductor region, one such portion evidencing a resistivity level at least one order of magnitude greater than that of the other said portion.

6. The device of claim 1 together with means for impressing a D.-C. field in the said direction, such field being of sufficient magnitude to result in an excess carrier gradient in the said direction, the maximum and minimum values of effective resistivity along the said gradient differing by at least one order of magnitude.

7. The device of claim 1 in which at least a portion of the said second region is of intrinsic conductivity type.

8. The device of claim 1 in which the second region is substantially planar, in which the resistivity in any plane within and parallel with the said second region is substantially constant, and in which the minimum and maximum resistivity levels within the said second region differ by at least one order of magnitude.

References Cited in the file of this patent

UNITED STATES PATENTS

| | | |
|---|---|---|
| 2,773,250 | Aigrain et al. | Dec. 4, 1956 |
| 2,790,037 | Shockley | Apr. 23, 1957 |
| 2,791,759 | Brown | May 7, 1957 |
| 2,864,953 | Lange | Dec. 16, 1958 |
| 2,970,275 | Kurzrok | Jan. 31, 1961 |

OTHER REFERENCES

Reed: "IRE Transaction on Electron Devices," April 1959, pp. 216–224.

Herrmann et al.: "Proceedings of the IRE," June 1958, pp. 1301–1303.